United States Patent [19]
Osterhaus

[11] 3,794,215
[45] Feb. 26, 1974

[54] POWDER COMPACTING APPARATUS FOR USE WITH A MECHANISM FOR AUTOMATICALLY MEASURING AND DISPENSING UNIT QUANTITIES OF DRY POWDER

[75] Inventor: Joseph C. Osterhaus, Port Jefferson, N.Y.

[73] Assignee: Eli Lilly and Company, Indianapolis, Ind.

[22] Filed: May 12, 1972

[21] Appl. No.: 252,795

[52] U.S. Cl.................... 222/1, 222/194, 222/410, 100/177
[51] Int. Cl............................................. B65b 13/20
[58] Field of Search... 222/298, 410, 302, 303, 168, 222/1, 367, 368, 370, 345; 100/177, DIG. 6, 43; 141/1; 425/427, 435

[56] References Cited
UNITED STATES PATENTS
2,297,244  9/1942  Pfahl............................. 100/DIG. 6

Primary Examiner—Stanley H. Tollberg
Assistant Examiner—James M. Slattery
Attorney, Agent, or Firm—Everet F. Smith; Ralph E. Ernsberger

[57] ABSTRACT

Powder compacting apparatus for use with a mechanism for automatically measuring and dispensing unit quantities of dry powder comprising means for transporting said dry powder through a tunnel having a progressively diminishing cross-sectional area wherein said dry powder is compacted to a uniform density immediately preceding and during the process of the measuring of the unit quantities of the dry powder.

19 Claims, 5 Drawing Figures

PATENTED FEB 26 1974 3,794,215

POWDER COMPACTING APPARATUS FOR USE WITH A MECHANISM FOR AUTOMATICALLY MEASURING AND DISPENSING UNIT QUANTITIES OF DRY POWDER

BACKGROUND OF THE INVENTION

1. Field of the Invention

This invention relates to a powder compacting apparatus which operates in conjunction with a mechanism for automatically measuring and dispensing unit quantities of dry powder. The mechanism for measuring and dispensing unit quantities of dry powder is believed to have been first described and claimed in U.S. Pat. No. 2,540,059. Subsequent patents have issued describing improvements to the original invention.

2. Description of the Prior Art

The mechanism for measuring and dispensing unit quantities of dry powder with which the subject invention operates can be described as being comprised of a plurality of devices each of which is essentially a hollow cylinder having disposed therein a movable foraminous membrane member which permits the transfer of fluid in both directions but inhibits the movement of dry powder from one side to the other. A chamber is thus defined in one end of said cylinder and by adjusting the distance of the foraminous membrane from the open end of the cylinder the volume of the chamber can be changed. This chamber serves as a volumetric measure for dry powder. In operation, a plurality of such devices are arranged in an endless sequence, and in order that a unit quantity of dry powder can be measured in the chamber, said chamber is introduced into the bed of dry powder and simultaneously a vacuum is pulled on the back side of the foraminous membrane. Dry powder is then drawn into said chamber thus measuring a unit quantity of such powder.

One of the problems which has plagued the operation has been the lack of uniformity of the density of the dry powder in the bed into which the chamber end of the cylinder is introduced. Consequently, the measurement of the quantity of dry powder has varied considerably from one device to another.

Among the many uses to which this means for measuring unit quantities of dry powder has been put is that of filling dry powder into two-piece capsules in the pharmaceutical industry. Other uses have included measuring unit doses of dry powder for filling into ampoules, such as antibiotics which are later put into solution immediately prior to injection. Another useful application of this method of measuring unit quantities of dry powder has been for ordnance, where the powder charge going into small arms cartridges has been measured by this means.

In all of these applications it is desirable to maintain the variation from unit quantity to unit quantity at the very minumum. It is much easier to maintain this uniformity when the dry powder which is being measured by the chamber in the end of the cylinder has a uniform density at all times. This uniform density has not always been possible to achieve especially where the dry powder is made up of a number of different ingredients having widely varying densities. Also there is a problem in the uniformity of the bulk density when there are wide differences in the particle size dimensions within the powder.

Accordingly, it is an object of this invention to provide a means for maintaining a uniformly densified dry powder at the location in the powder bed where the devices which measure the unit quantities are introduced into such powder bed and said unit quantities of dry powder are drawn into the chambers of said devices.

Another object of this invention is to provide a means for compacting the dry powder in conjunction with the powder reservoir which holds the dry powder from which the unit quantities are measured.

SUMMARY

It has now been discovered that a means for providing a uniformly densified dry powder bed from which unit quantities of dry powder are measured by the mechanism for automatically measuring and dispensing unit quantities of dry powder is comprised of a rotatable circular pan having an essentially flat bottom and an integral circumferential side wall and an axial annular baffle affixed to and extending upperwardly from said flat bottom, said pan operating in cooperation with a circular pan cover which is stationarily, coaxially and spatially disposed above said pen, said pan cover having an opening for receiving the mechanism for automatically measuring and dispensing unit quantities of dry powder and in addition having an integral tunnel with a progressively diminishing cross-sectional area through which the dry powder is transported wherein the dry powder in compacted to a uniform density prior to the measurement of said unit quantities of dry powder.

DESCRIPTION OF THE PREFERRED EMBODIMENTS

Figure 1:
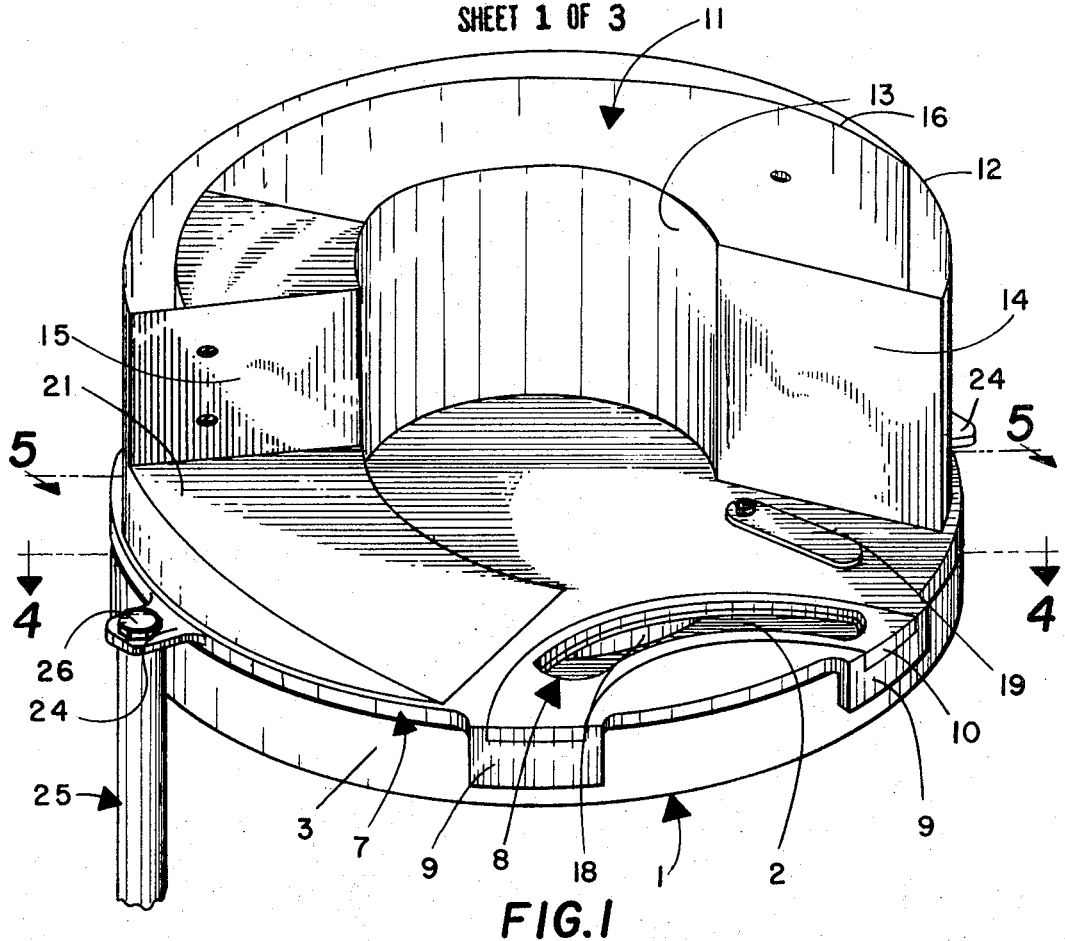
FIG. 1 is a perspective view of the powder compacting apparatus for use with a mechanism for automatically measuring and dispensing unit quantities of dry powder.

In the following detailed description of the embodiments of this invention, reference is made to the accompanying drawings.

The powder compacting apparatus for use with a mechanism for automatically measuring and dispensing unit quantities of dry powder comprises: a) A rotatable circular pan having an essentially flat bottom, an integral circumferential sidewall extending upwardly at about 90° from said bottom, an axial annular baffle affixed to and extending upwardly at about 90° from said bottom, traction lugs affixed to the upper side and a rotatable shaft affixed to the under side of said bottom.

b. An essentially flat cooperating circular pan cover stationarily, coaxially and spatially disposed above said pan having a first opening for receiving the devices constituting the mechanism for automatically measuring and dispensing unit quantities of dry powder, a second opening through which dry powder is introduced into said pan, vertical side walls defining a hopper affixed to edges of said second opening, a curvilinear vertical baffle having a progressively diminishing radius mounted longitudinally in said hopper, and three sides of a four-sided tunnel, the fourth of which is provided by said cooperating pan bottom.

c. Means provided for mounting said pan cover spatially above said pan.

d. Means provided for rotating said pan.

The novel powder compacting apparatus for use with a mechanism for automatically measuring and dispensing unit quantities of dry powder which constitutes this invention operates as described and illustrated hereinafter.

Referring to FIG. II, there is seen a rotatable circular pan 1. This rotatable circular pan has an essentially flat bottom 2. An integral circumferential sidewall 3 extends upwardly from said pan bottom at 90°. Traction lugs 5 are affixed to the essentially flat bottom 2 of said pan 1. These traction lugs 5 are affixed to the pan bottom 2 so that their longitudinal axes are parallel to a radius line of said pan bottom 2. The traction lugs 5 have a longitudinal dimension of from about one-fifth to about three-fifths of the radius of said pan 1, a width of from about one-sixteenth to about one-half inch and extend upwardly from the surface of the pan bottom 2 from about one-sixteenth to about three-eighths inch. Extending upwardly from the bottom 2 of said pan 1 is an axial annular baffle 4 which rises to a height of from about one-fifth to about three-fourth of the height of the integral circumferential sidewall 3 of said pan 1. This axial baffle 4 is from one-sixteenth to about three-eighths inch wide and is positioned at a distance from the center point of said pan equal to from about one-fifth to about two-fifths of the radius thereof.

Figure 2:
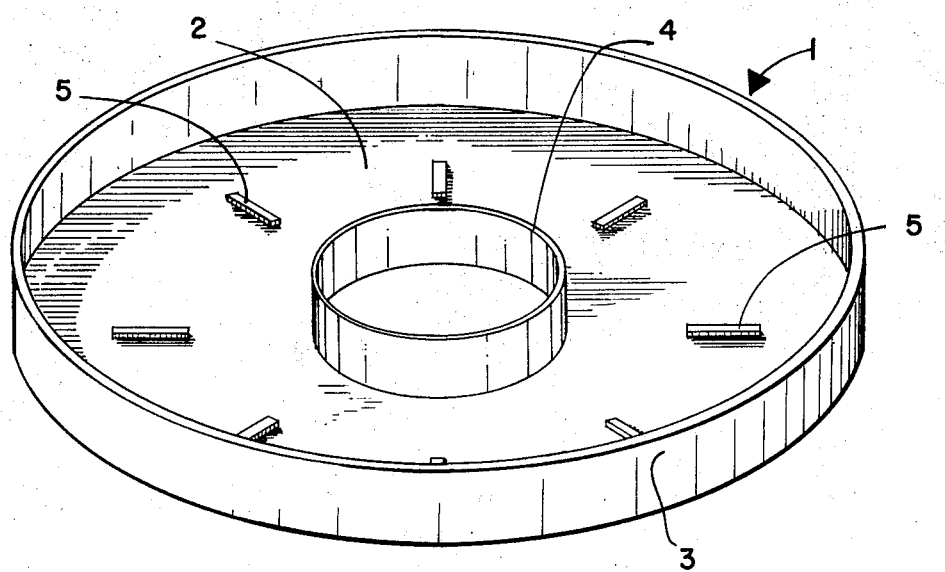
FIG. 2 is a perspective view from the top of the rotatable circular pan portion of the powder compacting apparatus.

In FIG. 1 there can be seen the various external elements of the cooperating pan cover 7 which is stationarily, coaxially and spatially disposed above the circular rotating pan 1 illustrated in FIG. 2. The cooperating circular pan cover is essentially flat although there are two openings in this flat top, one of which is quite extensive, but this flat top extends completely around the perimeter of the pan cover 7.

There is a first opening 8 in pan cover 7 which serves for receiving the devices of the mechanism for automatically measuring and dispensing unit quantities of dry powder. This first opening 8 in said pan cover 7 is a curvilinear opening essentially in the form of a arc of a circle partially external to said pan cover 7. This arc intersects the perimeter of pan cover 7 at points separated by from about 45° to about 120°. In FIG. 1 this first opening 8 is shown as an opening in an insert 10 which forms a part of the flat surface of the pan cover 7. First opening 8 is slightly wider than the devices constituting said mechanism. Turned-down ears on the flat top of a pan cover 7 are shown as supports 9 for insert 10. This is a preferred design but is not necessary and could just as well have been worked out as an opening which started about one-fiftieth to about one-tenth of the radius of said pan cover from the edge of the perimeter thereof. No insert would have been required but in order that a greater degree of lubricity could be provided for the movememt of the carrier for the devices which are introduced into the bed of powder, carried in said rotatable circular pan 1, it was found that an insert such as one that can be fashioned a material having a low coefficient of friction, such as a polyfluorinated hydrocarbon polymer, was a preferred design.

The pan cover 7 is shown in FIG. 1 with the sidewalls, tunnel top, and curvilinear baffle in place. The second opening 11 is indicated as that area where the powder is introduced. The second opening 11, before the side walls, tunnel cover, and curvilinear baffel were installed actually encompassed a curvilinear area extending from the first transverse side wall 14 around to the point at which the tunnel cover 21 meets the flat top of pan cover 7 just before the first opening 8 begins.

The second opening 11 in said pan cover 7 is a curvilinear opening having longitudinal curvilinear sides defined respectively by two arcs. The first (outer) arc has a radius of from about four to about seven times the thickness of the side wall of said cooperating pan 1 less than the radius of said pan cover 7. The second (inner) arc has a radius of from about one-fourth to about three-fifths of the radius of said pan cover 7. The second opening 11 extends from about 120° to about 300° of the perimeter of said pan cover 7. The first and the second arcs respectively are connected at the ends thereof by a first and second transverse side which joins the two curvilinear arcs. An outer curvilinear member 12 is affixed to the outer edge of said curvilinear second opening 11, and projects both upwardly and downwardly from said edge at about 90°. An inner curvilinear member 13 is affixed to the inner edge of said curvilinear second opening 11 and projects both upwardly and downwardly about an equidistance with said outer curvilinear member 12 at about 90° from the edge of said opening 11. A first transverse member 14 is affixed to the first transverse edge of said curvilinear opening 11 and extends upwardly from said edge at about 90° to the same height as said outer and inner curvilinear sidewall members and is affixed to one end of both of said members. A second transverse member 15 connects said outer and inner curvilinears members at a point from about one-fifth to about four-fifths of the distance from said first transverse side to said second transverse side respectively of said second opening 11. This second transverse member 15 extends downwardly from the top edges of both the outer and inner curvilinear members, 12 and 13 respectively, to a point from about one-tenth to about three-fifths of the distance from said second opening 11 to said top edges of said outer and inner curvilinear members. A curvilinear vertical baffle 16 is mounted longitudinally in the hopper formed by the two curvilinear members 12 and 13 and the two transverse members 14 and 15. The vertical baffle 16 is affixed to the inside of the outer curvilinear member 12 at a point from about 10° to about 90° from the first transverse member 14. The other end of the vertical baffle 16 is affixed to the second transverse member 15 at a point from about one-twentieth to about one-fourth of the distance from the outer curvilinear member 12 to the inner curvilinear member 13. The transverse dimension of vertical baffle 16 is essentially coextensive with the transverse dimension of curvilinear member 12.

FIG. 1 also shows the top member 21 of a three-sided tunnel of progressively diminishing cross-sectional area. This top member 21 is curvilinear in form and extends from a junction with the bottom edge of the second transverse member 15 and the outer and inner curvilinear members, 12 and 13 respectively, to a point at the second transverse side of the second opening 11 and at that point said top member 21 meets the flat top of the pan cover 7 and becomes integral therewith. From the point from where top member 21 originates, said member progressively slopes to a meeting with the flat top of the pan cover 7. In this particular section of the apparatus the outer curvilinear member 12 declines from the point where the second transverse member 15 and the top member 21 are joined thereto to a point where it meets the second transverse side of the second opening 11. Similarly, the inner curvilinear member 13 declines from the point where the second transverse member 15 and the top member 21 join with the two curvilinear members to a point where it meets the second transverse side of the second opening 11.

Also shown in FIG. 1 are means 24 for mounting said pan cover 7 spatially above said rotatable circular pan 1. These pan cover mounting members 24 are shown in FIG. 1 as being affixed to a stanchion 25 by a stud bolt 26.

The heart of the design of the powder compaction apparatus of this invention resides in the tunnel through which the powder is transported to effect a compaction prior to the time that the devices of the mechanism for automatically measuring and dispensing unit quantities of dry powder are introduced into the bed of dry powder. This compacting operation is performed through the cooperation of the rotatable circular pan 1 and the pan cover 7. Pan cover 7 is stationarily, spatially, and coaxially disposed above pan 1. Pan 1 rotates and in its rotation does not contact the pan cover. By virtue of the novel design of this invention the powder is not only compacted as it moves through the tunnel having a progressively diminishing cross-sectional area, but in addition, through the unique design of the baffels and sidewalls powder is held in the compacting apparatus in such a manner that it does not spill out in the area between the top edge of the rotatable circular pan 1 and the top cover 7.

Figure 3:
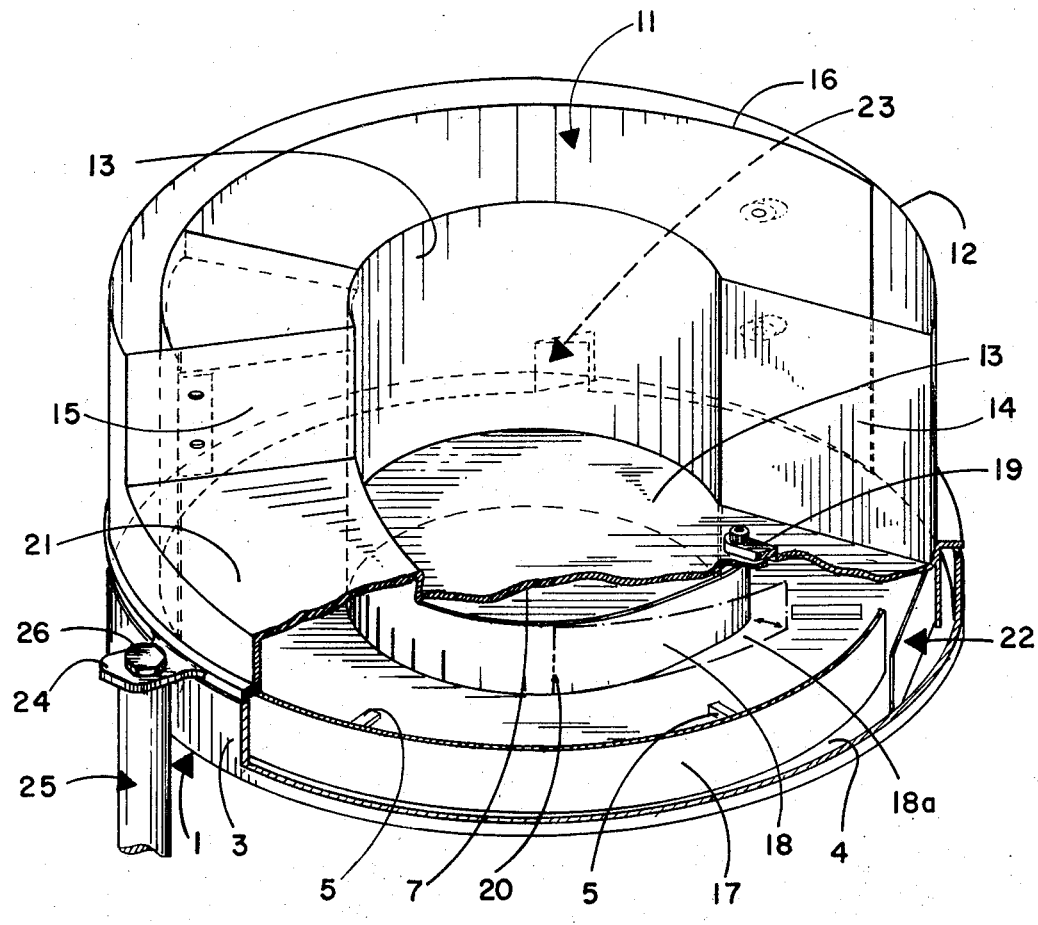
FIG. 3 is a partial cut away perspective view of the powder compacting apparatus showing the rotatable circular pan with the pan cover spatially disposed thereabove.

The basic elements which comprise the unique design of this apparatus are seen by refrring to FIG. 3. FIG. 3 is not only a partial cut away perspective view of the apparatus but it is also illustrative of the internal design of the apparatus and illustrates the various locations of the elements which cooperate in this invention. The rotatable circular pan 1 is shown with part of the sidewall 3 removed. Both the outer curvilinear member 12 and the inner curvilinear member 13 are shown extending below the top surface of pan cover 7 to a point near the upper surface of the bottom 2 of rotatable circular pan 1 but do not touch the bottom of the said pan 1. Transverse member 14 extends only to the top edge of said second opening 11. The second transverse member 15 extends from the top of the two curvilinear members down to the point where the tunnel top member 21 begins. The curvilinear longitudinal vertical baffle 16 extends only as far as said second transverse member 15. The eccentric radius of vertical baffle 16 serves to continuously move the bulk of the powder away from the sidewall 3 of pan 1. At the point where said baffle terminates the powder then enters the tunnel which has a progressively diminishing cross-sectional area.

As the rotatable circular pan 1 turns in a counter clockwise direction the traction lugs 5 help to keep the dry powder moving in the direction the pan is turning. As this dry powder is moved into the area of the tunnel it encounters resistance from the diminishing cross-sectional area which is formed by the lower extension of the outer and inner curvilinear members 12 and 13 to the point where the second transverse edge of the second opening 11 is located. A gradual slope on the top tunnel member 21 from the point of its origination to the point where it meets the flat surface of the pan cover 7 also contributes to the progressively diminishing cross-sectional area. And, as the powder moves through this area it meets greater and greater resistance and, of course, becomes more and more compact. Extensions of th under-the-surface sections of the outer and inner curvilinear members 12 and 13 are provided. The extension 17 of the outer curvilinear member 12 has a progressively diminishing radius as it proceeds from the point where the second opening 11 terminates to a point essentially coinciding with the first transverse side of said second opening. The extension 18 of the inner curvilinear member 13 disposed on the under side of said pan cover 7 proceeds at a progressively increasing radius to a point essentially coinciding with the first transverse side of said second opening 11. Moreover, the extension 18 of the inner curvilinear member 13 is movably disposed on the under side of said pan cover 7 and is illustrated at its maximum radius in FIG. 3 as 18a.

The extension 18 of th inner curvilinear member 13 is anchored to the inner curvilinear member 13 at about the second transverse edge of the second opening 11 and is free to move laterally at the point where it terminates essentially at the first transverse side of said second opening 11. A means for moving the terminal end of extension 18 is illustrated as 19 in FIG. 3. Also shown in FIG. 3 are two doctor blades 22 and 23 respectively. Doctor blade 22 is affixed to the leading edge of the under-side projection of the outer curvilinear member 12 and is mounted to contact the inner surface of the integral circumferential side wall 3 of rotatable circular pan 1. The doctor blade 23 is affixed to the outer curvilinear member 12 at a position approximately opposite the location of doctor blade 22 and is provided for sweeping powder which spills out from under the under-side projections of the curvilinear member 12, extension 17, and baffle 16 back into the main stream of powder which is being circulated in the rotatable circular pan 1.

Figure 4:
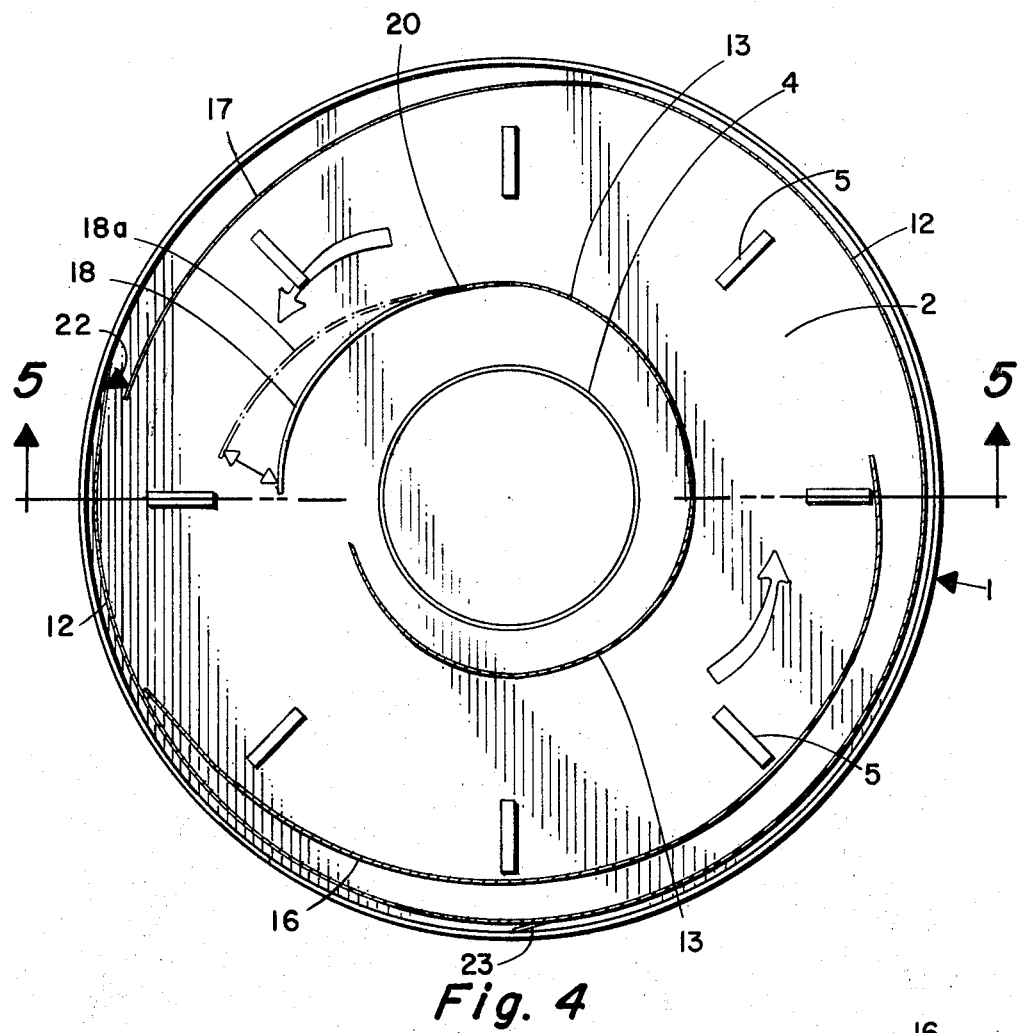
FIG. 4 is a cut away top plan view of the powder compacting apparatus looking toward the bottom of the rotatable circular pan with the attendant side walls and tunnel wall arrangement which are a part of the pan cover.

In FIG. 4 there can be seen the disposition of the various under-side members of the outer and inner curvilinear members and the extensions thereof as well as the vertical baffle 16. In FIG. 4, the rotatable circular pan 1 is shown turning in a counter-clockwise direction. The illustration is looking down on the essentially flat bottom 2 of the rotatable circular pan 1. The axial annular baffle 4 is shown inside of the under-side extension 18 of the inner curvilinear member 13. The traction lugs 5 are shown disposed inside of all of the under-side members 12 and 17 and the baffle 16. While such a position for the traction lugs 5 is a particularly desirable one, it is not essential that the lugs be so positioned as the lower projection of the side wall members and the baffle can terminate at a point above the top surface of the essentially flat bottom 2 of the rotatable circular pan 1 where the lugs can move underneath these extensions. However, it is preferred that the clearance of the bottom edges of these members and the top surface of the pan bottom 2 should be as little as possible to minimize the amount of powder that is moved to the perimeter of the rotatable circular pan 1.

While the outer and inner curvilinear members 12 and 13 respectively are shown as having essentially constant radii from their point of origin to the position to which the underside extensions are attached such is not necessary to the successful operation of this powder compacting apparatus and, as a matter of convience only, the radii were held essentially constant to facilitate construction. The exact deviation of the vertical baffle 16 from a radius that is constant is of relatively little importance, since this particular baffle serves primarily to move the powder away from the sides of the rotatable circular pan 1 and put it into a position to enter the tunnel in a favorable location. The decreasing radius shown for the extension 17 of the outer curvilinear member 12 is of no significant consequence but facilitates the compacting operation. In practice the powder compacting apparatus could be operated effectively if this extension were essentially a continuation of the radius of the outer curvilinear member 12. If this were the case then the increasing radius of the inner curvilinear member extension 18 could be utilized to a greater extent. However, the two extensions, 17 and 18 working in cooperation should provide for a significantly diminishing cross-sectional area at the point where the devices of the mechanism for automatically measuring and dispensing unit quantities are introduced.

Figure 5:
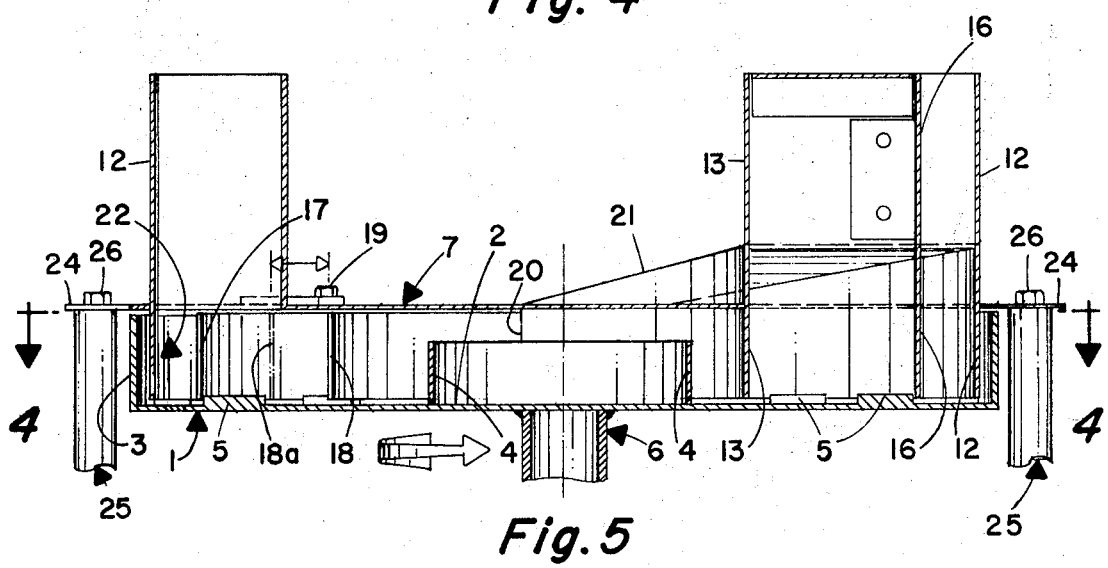
FIG. 5 is a vertical cross-sectional side view of the powder compacting apparatus showing the rotatable circular pan and the pan cover spatially disposed thereabove.

The cross-sectional vertical view of the apparatus for compacting dry powder shown in FIG. 5 depicts the relative relationship of the curvilinear side wall members on the under side of the surface of the pan cover 7. Each of the two curvilinear members 12 and 13 respectively project below the under side of the pan cover 7 a distance which puts their bottom edges just above the top surface of the essentially flat bottom of the rotatable circular pan 1. The curvilinear vertical baffle 16 projects essentially the same distance below the under surface of the pan cover 7. In order for the novel powder compacitng apparatus of this invention to be operable it is essential that the pan cover 7 be spatially disposed coaxially and stationarily above the rotatable circular pan 1. The powder which is to be compacted is filled into the rotatable circular pan through the second opening 11. The rotatable circular pan 1 is rotated in a counter clockwise direction and as the dry powder is transported by the turning of the pan it moves through the tunnel which has a progressively diminishing cross-sectional area and in this movement is gradually compacted into a dry powder bed having an essentially uniform bulk density. This compaction proceeds through a section of the pan cover cooperating with the rotatable circular pan and the dry powder is compacted to a uniformly densified powder before the devices of the mechanism for measuring and dispensing unit quantities of dry powder are introduced into the bed of dry powder. Immediatey the devices of the mechanism for measuring and dispensing unit quantities of dry powder are introduced into the bed of compacted dry powder there is an additional constriction applied to the moving dry powder bed in order that the voids which are left in the bed as the devices are removed therefrom can be filled in. This compaction and constriction of the dry powder leads to a minimum amount of variation in the weight of the powder drawn into the chambers in successive devices. The devices which constitute the mechanism for measuring and dispensing unit quantities of dry powder are described in U.S. Pat. application Ser. No. 215,606. Each device consists essentially of a long hollow cylinder which is open at one end and in which is disposed a moveable foraminous membrane which then defines a chamber having a constant cross-sectional area and a variable length. Inasmuch as the foraminous membrane may be moved toward or away from the open end of said cylinder, the volume of dry powder can be altered by changing the volume of the chamber. There are a plurality of these individual devices arranged on an endless conveyor with the chamber end down. As each of these devices passes over the edge of the first opening in the powder compacting apparatus a cam means moves said device from its position above the opening 8 down and into the bed of dry powder. Vacuum is applied to the back side of the foraminous membrane and a unit quantity of dry powder is drawn into said chamber from the bed of dry powder.

The novel powder compacting apparatus of this invention provides a uniformly densified bed of dry powder from which to measure unit quantities of dry powder. A uniformly densified bed of dry powder is beneficial in holding the weight variation between unit quantities of dry powder to a minimum.

What is claimed is:

1. A powder compacting apparatus for use with a mechanism for automatically measuring and dispensing unit quantities of dry powder comprising:
   1. a rotatable circular pan having,
      a. an essentially flat bottom,
      b. an integral circumferential sidewall extending upwardly at about 90° from said bottom,
      c. an axial annular baffle affixed to and extending upwardly at about 90° from said bottom,
      d. traction lugs affixed to the upperside of said bottom, and
      e. a rotatable shaft affixed to the underside of said bottom;
   2. an essentially flat cooperating circular pan cover stationarily, coaxially and spatially disposed above said pan having,
      a. a first opening for receiving the devices constituting the mechanism for automatically measuring and dispensing unit quantities of dry powder,
      b. a second opening through which dry powder is introduced into said pan,
      c. vertical sidewalls defining a hopper affixed to the edges of said second opening,
      d. a curvilinear vertical baffle having a progressively diminishing radius mounted longitudinally in said hopper, and
      e. three sides of a four-sided tunnel, the fourth of which is provided by said cooperating pan bottom;
   3. means for mounting said pan cover; and
   4. means for rotating said pan.

2. The apparatus of claim 1 wherein said traction lugs are elongated bars of a length of from about one-fifth to about three-fifths of the radius of said pan, a width of from about one-sixteenth to about one-half inch, extending from about one-sixteenth to about three-eighths inch above the surface of said pan bottom, and are affixed to said pan bottom with their longitudinal axes parallel to a radius line of said pan.

3. The apparatus of claim 1 wherein said axial annular baffle extends upwardly from the bottom of said pan to a height equal to form about one-fifth to about three-fourth of the height of said sidewall of said pan, is from about one-sixteenth to about three-eighths inch wide and is positioned at a distance from the center point of said pan equal to from about one-fifth to about two-fifths of the radius thereof.

4. The apparatus of claim 1 wherein said pan cover is essentially a flat plate having a diameter approximately equal to the outside diameter of said pan with which it cooperates plus from about 2 to about 5 times the thickness of the sidewall of said pan.

5. The apparatus of claim 1 wherein said first opening in said pan cover is a curvilinear opening essentially in the form of an arc of a circle partially external to said pan cover, said arc intersecting the perimeter of said pan cover at points separated by from about 45° to about 120°, said opening being slightly wider than the devices constituting said mechanism for measuring and dispensing unit quantities of dry powder, said mechanism which are received therein, and beginning and ending at points from about one-fiftieth to about one tenth of the radius of said pan cover from the edge of the perimeter thereof.

6. The apparatus of claim 1 wherein said second opening in said pan cover is a curvilinear opening having two longitudinal curvilinear sides defined respectively by two arcs, the first (outer) of which has a radius from about 4 to about 7 times the thickness of the sidewall of said cooperating pan less than the radius of said pan cover and the second (inner) of which has a radius of from about one-fourth to about three-fifths of the radius of said pan cover, said second opening extending for from about 120° to about 300°, and a first and second transverse side connecting the respective ends of said curvilinear sides.

7. The apparatus of claim 1 wherein said vertical side walls defining a hopper are comprised of
1. an outer curvilinear member affixed to the outer edge of said curvilinear second opening, said curvilinear member extending both upwardly and downwardly from said edge at about 90°,
2. an inner curvilinear member affixed to the inner edge of said curvilinear second opening, said curvilinear member extending both upwardly and downwardly from said edge an equidistance with said outer curvilinear member at about 90°,
3. a first transverse member affixed to the first transverse edge of said curvilinear second opening, said transverse member extending upwardly from said edge at about 90° and affixed to one end of both said outer and inner curvilinear members,
4. a second transverse member connecting said curvilinear members and affixed thereto at a point from about one-fifth to about four-fifths of the distance from said first transverse side to said second transverse side respectively of said second opening, said second transverse member extending downwardly from the top edges of said outer and inner curvilinear members to a point from about one-tenth to about three-fifths of the distance from said second opening to said top edges of said outer and inner curvilinear members.

8. The apparatus of claim 7 wherein said outer and inner curvilinear members project downwardly from the undersurface of said second opening a distance essentially equal to the height of said sidewall of said pan above the uppersurface of said bottom thereof.

9. The apparatus of claim 7 wherein there is affixed to the portion of said outer curvilinear member projecting downwardly from said second opening doctor blades adapted to contact the inside of said sidewall of said pan.

10. The apparatus of claim 1 wherein one end of said curvilinear vertical baffle mounted longitudinally in said hopper is affixed to the inside of said outer curvilinear sidewall member at a point from about 10° to about 90° from said first transverse side wall member and the other end of said baffle is affixed to said second transverse sidewall at a point from about one-twentieth to about one-fourth of the distance from said outer curvilinear sidewall member to said inner curvilinear sidewall member, the transverse dimension of said baffle being essentially coextensive with the transverse dimension of said outer curvilinear sidewall member.

11. The apparatus of claim 1 wherein the three sides of a four-sided tunnel are defined by:
a. an essentially flat curvilinear top member, the first portion of which is disposed between said outer and inner curvilinear members, originating at and affixed to the bottom edge of said second transverse sidewall member and gradually sloping to a meeting with the top surface of said second opening and affixed to said sidewall members and said opening's second transverse side, the second portion of said top member being integral with the flat plate of said pan cover,
b. the outer curvilinear sidewall member extending upwardly to its connection with said top member, and an extension of that part of said outer sidewall member disposed on the underside of said pan cover, said extension proceeding at a progressively diminishing radius to a point essentially coinciding with the first transverse side of said second opening,
c. the inner curvilinear sidewall member extending upwardly to its connection with said top member, and an extension of that part of said inner sidewall member disposed on the underside of said pan cover, said extension proceding at a progressively increasing radius to a point essentially coinciding with the first transverse side of said second opening.

12. The apparatus of claim 10 wherein the extension of said inner sidewall member is movably disposed on the underside of said pan cover, said extension being affixed at its origin to said inner sidewall member and equipped at its terminal end with means for adjusting the location of said terminal end to alter the distance between said inner sidewall member extension and said outer sidewall member extension.

13. A powder compacting apparatus for use with a mechanism for automatically measuring and dispensing unit quantities of dry powder comprising:
1. a rotatable circular pan having an essentially flat bottom with an integral circumferential sidewall extending upwardly at about 90° from said bottom, said bottom having an axial annular baffle affixed thereto at position from about one-fifth to about two-fifths of the radius of said pan from the center thereof, said baffle rising from about one-fifth to about three-fourths of the height of said sidewall of said pan and having a width of from about one-sixteenth to about three-eighths inch, further said bottom having affixed thereto a plurality of elongated bars of a length of from about one-fifth to about three-fifths of the radius of said pan and a width and a height of from about one-sixteenth to about one-half inch, said bars disposed with their longitudinal axes parallel to a radius line of said pan, and a shaft affixed to the bottom of said pan;

2. a circular, essentially flat pan cover cooperating with said pan, said pan cover stationarily, coaxially and spatially disposed above said pan, said pan cover having a diameter slightly larger than said pan;

3. an essentially curvilinear first opening in said pan cover, said first opening being essentially in the form of an arc of a circle external to said pan cover, said arc intersecting the perimeter of said pan cover at points separated by from about 45° to about 120°, said first opening being slightly wider than the devices constituting said mechanism for automatically measuring and dispensing unit quantities of dry powder;

4. an essentially curvilinear second opening in said pan cover, said opening extending for from about 120° to about 300° of the perimeter of said pan cover and having a width of from about one-fourth to about three-fifths of the radius thereof;

5. outer and inner curvilinear sidewall members projecting both upwardly and downwardly from the respective longitudinal edges of said opening and affixed thereto;

6. a first transverse sidewall member extending upwardly from the first transverse edge of said opening, affixed thereto and connected to one end of said outer and inner curvilinear sidewall members;

7. a second transverse sidewall member disposed between said first and second curvilinear sidewall members and affixed thereto and extending downwardly from the top edges thereof to a point just above said second opening;

8. a top tunnel member disposed between said outer and inner curvilinear sidewall members and affixed thereto originating at the bottom edge of said second transverse sidewall member and extending at a gradual slope to a meeting with the second transverse side of said second opening, and affixed thereto;

9. a curvilinear extension of said first curvilinear sidewall member disposed below the edge of said second opening extending at a progressively decreasing radius to a point essentially coinciding with the beginning of said second opening;

10. a curvilinear extension of said second curvilinear sidewall member movably disposed below the edge of said second opening extending at a progressively increasing radius to a point essentially coinciding with the beginning of said second opening;

11. means for adjusting said progressively increasing radius of said movably disposed extension;

12. means for mounting said pan cover above said pan; and 13. means for rotating said pan.

14. A method of compacting dry powder to a uniform density in a bed from which unit quantities are volumetrically measured comprising introducing said dry powder into the mouth of a tunnel having a progressively diminishing cross-sectional area and a circular pan, transporting a moving bed of said dry powder through said tunnel by continuously moving one side of said tunnel in the direction of the constriction therein to a point where volumetric measuring devices are introduced into said moving bed, continuing the transport of said moving bed of dry powder through said tunnel to the point where said measuring devices are removed from said moving bed.

15. The method of claim 14 wherein the impetus for transporting said moving bed of dry powder through said tunnel means is provided by rotating the circular pan, which comprises one side of said tunnel, in the direction of the constriction in said tunnel.

16. The method of claim 15 wherein said impetus is augmented by equipping said circular pan with raised lateral lugs.

17. The method of claim 15 wherein said impetus is further augmented by operating said circular pan as the bottom side of said tunnel.

18. The method of claim 14 wherein the compacting of said dry powder from said point where said measuring devices are introduced into said dry powder bed to the point where said devices are removed therefrom is effected by converging the stationary sides of said compacting means.

19. A method of compacting dry powder to a uniform density in a bed from which unit quantities are volumetrically measured comprising:

a. introducing said dry powder into a reservoir operating in conjunction with a tunnel having a progressively diminishing cross-sectional area from its mouth to its outlet;

b. transporting said moving bed of said dry powder from said reservoir into and through said tunnel by continuously moving one side of said tunnel in the direction of said constriction therein;

c. continuing the transport of said moving bed of dry powder through said tunnel to a point where volumetric measuring devices are introduced into said moving bed;

d. converging the sides of said moving bed as said bed is transported from the point where said measuring devices are introduced into said bed to the point where said devices are removed from said bed; and e. releasing said moving bed from the progressively diminishing cross-sectional area of said tunnel.

* * * * *